Feb. 11, 1958   F. L. R. BROWN   2,823,244
ELECTRIC ACCUMULATORS
Filed Aug. 2, 1955   2 Sheets-Sheet 2

INVENTOR
FRANCIS LEONARD ROBERT BROWN
BY Hane and Nydick
ATTORNEYS

United States Patent Office 2,823,244
Patented Feb. 11, 1958

2,823,244

ELECTRIC ACCUMULATORS

Francis Leonard Robert Brown, Stelling, near Canterbury, England

Application August 2, 1955, Serial No. 525,909

Claims priority, application Great Britain August 6, 1954

9 Claims. (Cl. 136—55)

This invention relates to electric accumulators and has for its object the provision of an improved electric accumulator which will be efficient, inexpensive and light in weight, and which will remain serviceable for a long period.

The invention consists broadly of an electric storage cell in which the positive element comprises a layer of metallic lead applied upon the outer surface of a cylindrical core and a layer of lead oxide or oxides applied on said layer of metallic lead, and the negative element surrounds said positive element.

In order that the invention may be the more clearly understood certain examples of electrical storage cells in accordance therewith will now be described, reference being made to the accompanying drawings wherein.

Figures 1, 2, 3:
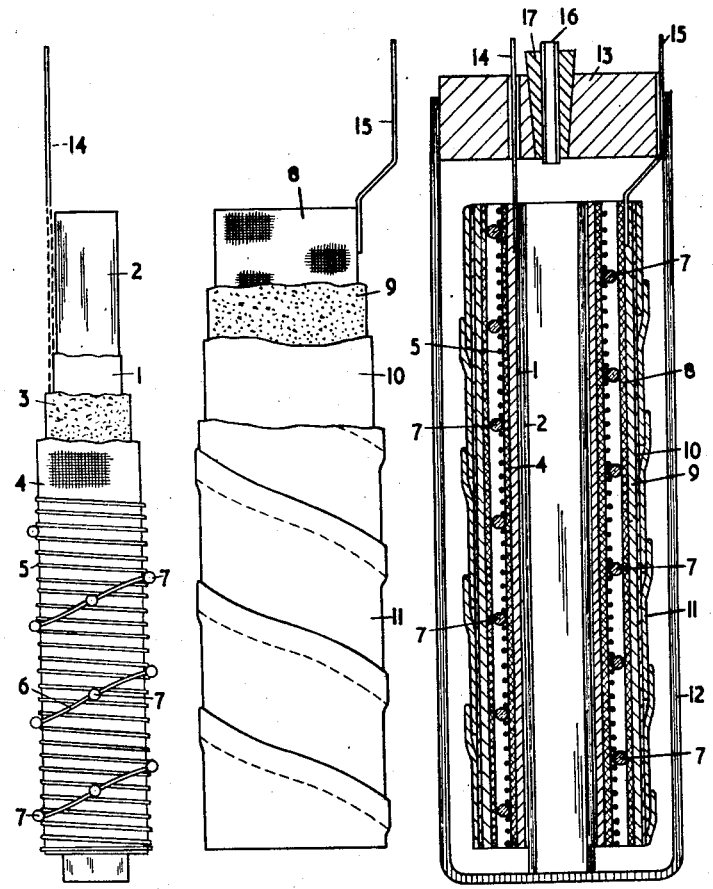
Figure 1 is an elevation of the positive element of a storage cell according to the invention with certain of the component parts partially stripped off for the better illustration of the construction.
Figure 2 is a similar view of the negative element of said storage cell.
Figure 3 is a sectional elevation of the complete assembled cell.

Referring first to Figures 1 to 3, the accumulator cell therein illustrated has a positive element which is constituted by a thin layer 1 of metallic lead applied upon the outer surface of a hollow cylindrical core 2, said lead layer in turn being coated with a lead oxide or a mixture of lead oxides 3. The material of the core 2 is a material, which is not acted upon by the acid electrolyte, such as glass, ebonite or an acid resisting plastic. The lead layer 1 may be in the form of lead foil or may be applied by electrochemical deposition or by a metallic spray process or by a combination of these processes. The lead oxide or oxides 3 may be applied dry or mixed with water, with or without the addition of sulphuric acid, in the form of a thin paste.

Outside the oxide or oxides 3 is a layer of one or more thicknesses of woven material such as cotton or glass cloth 4 which acts as a filter, preventing the escape of the active material but allowing the escape of gases during the action of the cell. This may be applied after the oxides are sufficiently dry to maintain an adherent condition, or a layer of the oxide paste may be first applied upon a section of the woven fabric cloth and the cloth, with the paste on it may be wrapped around the cylinder with or without the addition of one or more thicknesses of unpasted cloth. If desired the cloth 4 may take the form of cloth tape and be wound helically on the cylinder.

To retain the paste 3 the more firmly, an open helix of rubber cord 5 under tension is next wound round the cylinder outside the glass cloth 4. This rubber cord 5 is suitably tensioned and will continue to exercise an even radial pressure on the paste 3. Instead of rubber cord, however, glass cord or plastic cord could be employed.

Finally a few helical turns of a cord 6 (which may be a continuation of the cord 5) are wound around the cylinder. This cord 6 is knotted or otherwise formed with enlargements 7, and these, as will hereinafter appear, serve to space the positive element from the negative element.

The negative element is also of cylindrical form and surrounds the positive element coaxially. Thus the area of the negative element is greater than that of the positive element, and this is found to be advantageous in that it results in a decrease in the resistance of the cell. Said negative element consists of a cylindrical metallic base 8 of gauze or perforated foil coated on the outside with a thin layer 9 of active negative lead. Outside the layer 9 is a layer of thin acid-proof paper 10. This is because the most convenient way of applying the active negative lead 9 to the gauze cylinder 8 is to apply it first to a sheet of the paper 10 and then wrap it together with the paper around said gauze cylinder. Finally a tape 11 of polythene is wound helically, with the adjacent turns lapped, around the paper 10.

It will be seen that, by applying the paste 9 on that side of the gauze cylinder 8 which is furthest from the positive element, the escape of any of said paste into the space between the negative and positive elements is made substantially impossible. A suitable mesh and gauge of the gauze to ensure against this is 30 mesh 33 S. W. G. The negative paste 9 consists of lead monoxide (lithage) or a mixture of oxides, with the addition of dilute sulphuric acid or ammonium sulphate solution, with or without the addition of expanders, i. e. small quantities of materials for the purpose of maintaining the capacity of the negatives.

When the negative and positive elements are assembled together as shown in Figure 3 it will be seen that the knots or enlargements 7 on the cord 6 form spacers which maintain the outer surface of the positive element suitably spaced from the inner surface of the negative element.

The acid electrolyte is dilute sulphuric acid, and the potential of the cell when charged, if the dilute sulphuric acid is about 33 grammes of sulphuric acid in 100 grammes of solution (specific gravity say 1.25 at 15 degrees centigrade) will be, say, two volts. The metal or metal alloy used for the gauze cylinder 8 should be such that the potential developed by the same cell, if such gauze cylinder were not pasted—that is to say the solution pressure of the metal of the gauze cylinder—would be about 1.5 volts. Any metal which gives not more than 1.7 volts would be reasonably satisfactory. A suitable metal is copper or brass.

Referring to Figure 3 which illustrates the complete cell, it will be seen that the positive and negative elements are mounted coaxially in a cylindrical container 12 of say glass which contains the acid electrolyte. The open upper end of this container 12 is plugged by means of a stopper 13 of acid resisting material. For establishing the external connections a lug 14 of suitable cross section which is conductively attached to the lead layer 1 extends up through a hole in the stopper 13 and a wire conductor 15 which is conductively connected to the gauze cylinder 9 extends up through a notch in the periphery of said stopper 13.

The attachment of the lug 14 to the lead layer 1 is effected by arc or flame welding, or by soldering, and takes place at the stage immediately prior to the addition of the paste 3, and it may here be mentioned that, although the thin layer of lead becomes in course of time partly, if not wholly, converted into an electrically active oxide of lead, it is found that the resistance of the cell is not materially increased by the reduction of the metallic area in contact with the positive active material.

The stopper 13 has a vent through it constituted by a short tube 16 passing through a plug 17 which is plugged into a hole in said stopper 13.

Figures 4, 5, 6:
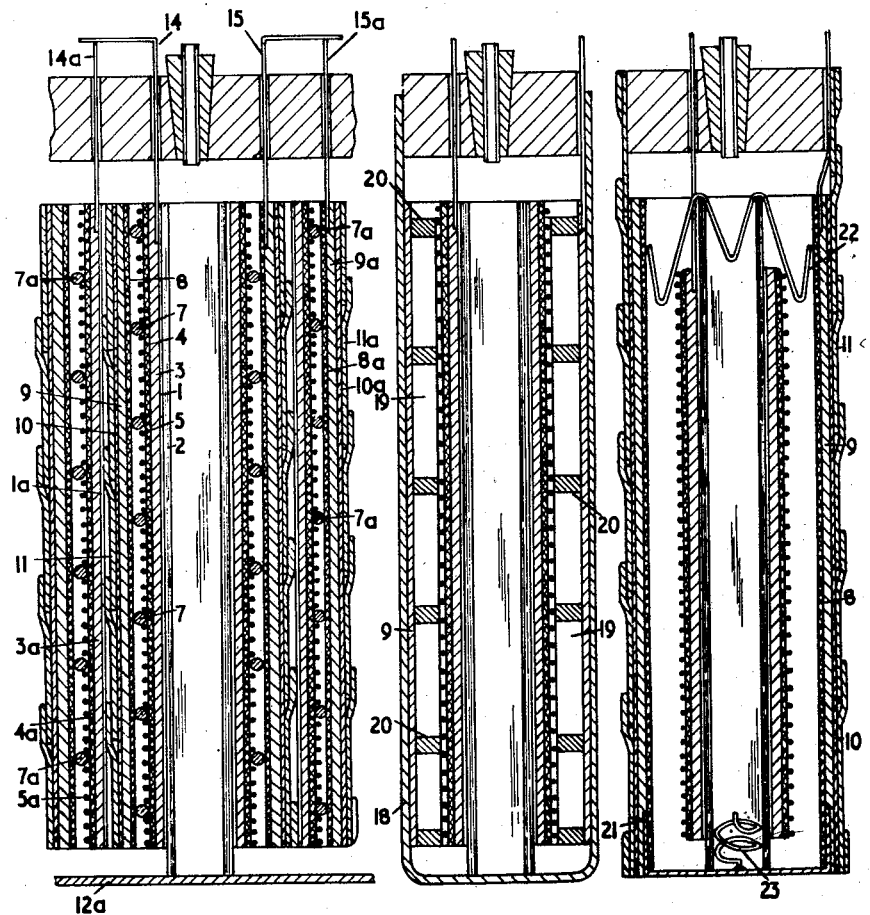
Figure 4 is a sectional elevation of a storage cell according to the invention which comprises a plurality of negative and positive elements.
Figure 5 is a sectional elevation of a storage cell according to the invention in which the negative element constitutes the container of the cell.
Figure 6 is a sectional elevation of an alternative storage cell according to the invention in which the negative element constitutes the container of the cell.

Referring now to Figure 4, this illustrates a modification of the cell of Figures 1 to 3 according to which an indefinite number of coaxial positive and negative elements may be provided in one container. In this modification a positive element and a surrounding negative element are provided which are identical with those illustrated in Figure 3. Then a second positive element is applied outside the negative element by applying a second layer 1a of metallic lead on the outside surface of the polythene layer 11 of said negative element with a second layer 3a of lead oxides on said layer 1a surrounded by a second layer 4a of cloth, a second helical winding 5a of rubber cord and a second helical winding of rubber cord with knots or enlargements 7a thereon. Around this second positive element is provided a second negative element. This is the same as the first negative element except that it is of course of greater diameter. Its parts are designated by the same reference numerals as those of the first negative element except that the suffix a has been added to each numeral. Obviously the series could be continued indefinitely. Finally all the elements are enclosed in a container 12a which is similar to, but larger than, the container 12.

Referring to Figure 5 this shows a cell which is similar to that of Figure 3 except that the negative element itself is made to constitute the container of the cell. The positive element is identical with that of Figure 3 except that it does not have the outer winding 6 with knots or enlargements 7. The negative element surrounds the positive element coaxially as before, but, instead of having a cylindrical base 8 of gauze coated on its outside with negative active material 9, it has a base constituted by an impervious container 18 of say copper or brass which is coated on its inside with the negative active material 9.

In this case it is necessary, in order to make room for a sufficient quantity of the acid electrolyte that there shall be a greater clearance between the positive and negative elements. It is also necessary that a firm support shall be provided to prevent the negative active material 9 from falling from the container 18. Both these objectives are attained by employing, as the spacer between the positive element and the negative element, a rigid cylindrical grid of ebonite or other suitable material having upright members 19 and annular members 20, both said upright and said annular members having perforations to enable the electrolyte to circulate adequately.

Referring to Figure 6 this illustrates another cell in which the negative element is made to constitute the container of the cell. In this case again the positive element is identical with that of Figure 3 except that it does not have the outer winding 6 with knots or enlargements 7. The negative element also is identical with that of Figure 3 except that, in the first place, it is of greater diameter relative to the positive element so that there is a larger clearance space between the two elements, and, in the second place, means are provided for closing and sealing the bottom of the gauze cylinder 8 so that the whole negative element together with its polythene wrapping 11 forms the container of the cell.

For closing the bottom of the gauze cylinder 8 a short cylindrical metal cap 21 is spot soldered over the bottom end of said gauze cylinder before the application of the polythene wrapping 11, and said wrapping is extended down over the side walls of said cap.

In the arrangement of Figure 6, the spacing of the positive and negative elements is effected at the top by means of a strip of flexible Celluloid 22 bent as shown and fitted under tension. At the bottom the positive element is located by means of a spiral of copper or brass wire 23 spot soldered to the bottom of the cap 21 and extending up inside the glass tube core of said positive element.

In the case of this embodiment it is of course essential that the wrapping 11 must be impervious but, in the case of the embodiment of Figure 3 it might be preferred to make said wrapping of pervious material.

In the case of each embodiment, the cell is preferably unbalanced owing to the provision of an excess of negative active material so that the potential difference of the negative element is always above 1.5 volts on open circuit. Thus the metal or alloy of the negative element will not enter into solution even when the cell is apparently discharged, as the negative active material will not be completely exhausted.

The chemical actions of the cell are apparently the same as in an ordinary lead acid accumulator and it should be noted that the metal or alloy of the negative element will not appreciably dissolve in the acid electrolyte even if said metal or alloy projects from the surface of the electrolyte, provided a film of electrolyte remains upon the metal or alloy and the film is continuous from the surface of the electrolyte.

It will be seen that each of the above described cells operates according to the ordinary lead acid combination, but, whereas in the majority of lead acid accumulators the inclusion of antimonial lead grids to carry the electrically active material is an objectionable feature on grounds of expense and weight, and also because the cell fails after a few hundred cycles owing to the disintegration of the positive grid and subsequent escape of the active material, the cell according to the present invention avoids the use of said antimonial lead grids and employs instead a carrying base of cheaper and much lighter material which will retain its active material for a long period.

I claim:

1. An electric storage cell comprising in combination, a positive element including an inner base core of a material not acted on by the acid electrolyte, lead on said core, positive active material overlying said lead on said core, a wrapping of flexible pervious material surrounding said positive active material, and an outer cord wound around said flexible pervious material; a negative element including a cylindrical perforate metallic plate concentric with and surrounding said positive element, a layer of active negative material coated on the outside of said metallic plate, and a wrapping of flexible material around the outside of said active negative material.

2. A cell according to claim 1, in which said core is of hollow tubular from.

3. A cell according to claim 1, in which said lead comprises a thin layer of lead foil enveloping said core.

4. A cell according to claim 1, in which said flexible pervious material comprises a helically wound lapped tape.

5. A cell according to claim 1, in which said perforate metallic plate comprises a layer of metallic gauze.

6. A cell according to claim 1, in which said wrapping of flexible material consists of polythene.

7. A cell according to claim 1, in which said negative element comprises an additional base core, an additional positive element supported upon said additional base core, and an additional negative element in surrounding concentric relationship with said additional positive element.

8. An electric storage cell comprising in combination, a positive element including an inner dielectric core, lead on said core, positive electrolytically active material applied around said core, a wrapping of flexible pervious material surrounding said positive active material, and an outer cord wound around said flexible pervious material; a negative element including a cylindrical perforate metallic plate concentrically surrounding said positive element, a layer of electrolytically active negative material coated on the outside of said metallic plate, a wrapping of impervious material around the outside of said active negative material, and a bottom closure closing the lower end of said negative element, whereby said negative element forms a container for the acid electrolyte.

9. A cell according to claim 8, in which said bottom closure is in the form of a bottom cap having side walls overlapped by said wrapping of impervious material.

References Cited in the file of this patent

UNITED STATES PATENTS

| Number | Name | Date |
|---|---|---|
| 538,628 | Silvey | Apr. 30, 1895 |
| 662,679 | Pullen | Nov. 27, 1900 |
| 724,619 | Schmidt | Apr. 7, 1903 |
| 725,067 | Gardine et al. | Apr. 14, 1903 |
| 741,675 | Dickson | Oct. 20, 1903 |
| 893,330 | Knobloch | July 14, 1908 |
| 1,034,156 | Sokal | July 30, 1912 |
| 1,363,729 | Haunz | Dec. 28, 1920 |
| 1,691,794 | Woodbridge | Nov. 13, 1928 |
| 2,463,565 | Ruben | Mar. 8, 1949 |
| 2,536,699 | Ruben | Jan. 2, 1951 |